United States Patent
Schroeder

(10) Patent No.: US 7,231,823 B2
(45) Date of Patent: Jun. 19, 2007

(54) METHOD FOR ELECTRONICALLY ADJUSTING THE SELECTIVE OSCILLATION FREQUENCY OF A CORIOLIS GYRO

(75) Inventor: Werner Schroeder, Ettenheim (DE)

(73) Assignee: LITEF GmbH, Freiburg (DE)

( * ) Notice: Subject to any disclaimer, the term of this patent is extended or adjusted under 35 U.S.C. 154(b) by 162 days.

(21) Appl. No.: 10/531,792

(22) PCT Filed: Oct. 8, 2003

(86) PCT No.: PCT/EP03/11142

§ 371 (c)(1),
(2), (4) Date: Apr. 18, 2005

(87) PCT Pub. No.: WO2004/038334

PCT Pub. Date: May 6, 2004

(65) Prior Publication Data

US 2006/0020409 A1    Jan. 26, 2006

(30) Foreign Application Priority Data

Oct. 18, 2002    (DE) ............................... 102 48 734

(51) Int. Cl.
*G01P 3/44* (2006.01)
*G01P 21/00* (2006.01)

(52) U.S. Cl. .................................. 73/504.12; 73/1.37

(58) Field of Classification Search ............. 73/504.02, 73/504.04, 504.12, 504.13, 504.14, 504.15, 73/504.16, 1.37, 1.38, 1.77, 1.78

See application file for complete search history.

(56) References Cited

U.S. PATENT DOCUMENTS

| | | | |
|---|---|---|---|
| 4,791,815 A * | 12/1988 | Yamaguchi et al. | ..... 73/504.16 |
| 5,736,640 A | 4/1998 | Farine et al. | |
| 5,847,279 A | 12/1998 | Piazza | |
| 6,915,215 B2 * | 7/2005 | M'Closkey et al. | .......... 702/32 |

FOREIGN PATENT DOCUMENTS

| | | |
|---|---|---|
| DE | 4447005 | 7/1996 |
| DE | 69620824 | 12/1996 |
| DE | 69615468 | 1/1997 |
| DE | 19641284 | 5/1998 |
| DE | 19910415 | 9/2000 |
| DE | 19939998 | 3/2001 |
| DE | 10062347 | 6/2002 |
| WO | 9745699 | 12/1997 |
| WO | 9919734 | 4/1999 |

\* cited by examiner

*Primary Examiner*—Helen Kwok
(74) *Attorney, Agent, or Firm*—Elliott N. Kramsky

(57) ABSTRACT

In a method for electronic tuning of the frequency of the read oscillation to the frequency of the stimulation oscillation in a Coriolis gyro, the resonator of the Coriolis gyro has a disturbance force applied to it such that the stimulation oscillation remains essentially uninfluenced. The read oscillation is changed so that a read signal that represents the read oscillation contains a corresponding disturbance component. The frequency of the read oscillation is controlled so that the phase shift between the disturbance signal and the disturbance component contained in the read signal is a minimum.

12 Claims, 2 Drawing Sheets

METHOD FOR ELECTRONICALLY ADJUSTING THE SELECTIVE OSCILLATION FREQUENCY OF A CORIOLIS GYRO

BACKGROUND

1. Field of the Invention

The present invention relates to Coriolis gyros. More particularly, this invention pertains to a method for electronic tuning of read oscillation frequency to stimulation oscillation frequency in such a device.

2. Description of the Prior Art

Coriolis gyros (also known as "vibration gyros") are increasingly employed for navigation. Such devices include a mass system that is caused to oscillate. Such oscillation is generally a superimposition of a large number of individual oscillations. The individual oscillations of the mass system are initially independent of one another and each may be regarded in the abstract as a "resonator". At least two resonators are required for operation of a vibration gyro. A first resonator is artificially stimulated to oscillate, with such oscillations referred to below as a "stimulation oscillation". A second resonator is stimulated to oscillate only when the vibration gyro is moved or rotated. That is, Coriolis forces occur which couple the first resonator to the second resonator, draw energy from the stimulation oscillation of the first resonator, and transfer the energy to the read oscillation of the second resonator. The oscillation of the second resonator is referred to below as the "read oscillation". In order to determine movement (in particular rotation) of the Coriolis gyro, the read oscillation is tapped off and a corresponding read signal (e.g. the tapped-off read oscillation signal) is analyzed to determine whether any changes occurred in the amplitude of the read oscillation that measures rotation of the Coriolis gyro. Coriolis gyros may be in the form of either an open loop or a closed loop system. In a closed loop system, the amplitude of the read oscillation is continuously reset to a fixed value (preferably zero) by control loops.

FIG. 2 is a schematic diagram of a closed loop Coriolis gyro 1. The gyro 1 has a mass system 2 that can be caused to oscillate and is referred to below as a resonator 2 (in contrast to the "abstract" resonators, mentioned above, which represent individual oscillations of the "real" resonator). As already mentioned, the resonator 2 may be regarded as a system composed of two "resonators" (a first resonator 3 and a second resonator 4). Each of the first and second resonators 3, 4 is coupled to a force transmitter (not shown) and to a tapping-off system (not shown). Noise produced by the force transmitter and the tapping-off system is indicated schematically by noise 1 (reference symbol 5) and noise 2 (reference symbol 6).

The Coriolis gyro 1 includes four control loops. A first control loop is employed for controlling the stimulation oscillation (i.e. the frequency of the first resonator 3) at a fixed frequency (resonant frequency). The first control loop has a first demodulator 7, a first low-pass filter 8, a frequency regulator 9, a VCO (voltage controlled oscillator) 10 and a first modulator 11. A second control loop controls the stimulation oscillation at a constant amplitude and includes a second demodulator 12, a second low-pass filter 13 and an amplitude regulator 14.

Third and fourth control loops are used for resetting forces that stimulate the read oscillation. The third control loop includes a third demodulator 15, a third low-pass filter 16, a quadrature regulator 17 and a second modulator 18. The fourth control loop comprises a fourth demodulator 19, a fourth low-pass filter 20, a rotation rate regulator 21 and a third modulator 22.

The first resonator 3 is stimulated at its resonant frequency $\omega 1$. The resultant stimulation oscillation is tapped off, demodulated in phase by means of the first demodulator 7, and a demodulated signal component passed to the first low-pass filter 8 that removes the sum frequencies. The tapped-off signal is referred to below as the tapped-off stimulation oscillation signal. An output from the first low-pass filter 8 is supplied to a frequency regulator 9 that controls the VCO 10 as a function of the applied signal so that the in-phase component essentially tends to zero. For this, the VCO 10 sends a signal to the first modulator 11, which controls a force transmitter so that a stimulation force is applied to the first resonator 3. When the in-phase component is zero, the first resonator 3 oscillates at its resonant frequency $\omega 1$. It should be mentioned that all of the modulators and demodulators are operated on the basis of resonant frequency $\omega 1$.

The tapped-off stimulation oscillation signal is also passed to the second control loop and demodulated by the second demodulator 12. The output of the second demodulator 12 is passed through the second low-pass filter 13, whose output signal is, in turn, applied to the amplitude regulator 14. The amplitude regulator 14 controls the first modulator 11 as a function of such signal and of a nominal amplitude transmitter 23 such that the first resonator 3 oscillates at a constant amplitude (i.e. the stimulation oscillation has constant amplitude).

As has already been mentioned, movement or rotation of the Coriolis gyro 1 results in Coriolis forces (indicated by the FC• cos($\omega 1 \cdot t$) in the drawing) that couple the first resonator 3 to the second resonator 4, causing the second resonator 4 to oscillate. A resultant read oscillation at frequency $\omega 2$ is tapped off so that a corresponding tapped-off read oscillation signal (read signal) is supplied to both the third and fourth control loops. In the third control loop, this signal is demodulated by means of the third demodulator 15, the sum frequencies removed by the third low-pass filter 16, and the low-pass-filtered signal supplied to quadrature regulator 17 whose output is applied to the third modulator 22 so that corresponding quadrature components of the read oscillation are reset. Analogously, the tapped-off read oscillation signal is demodulated in the fourth control loop by means of a fourth demodulator 19. It then passes through a fourth low-pass filter 20 and the filtered signal is applied to a rotation rate regulator 21. The output of the rotation rate regulator 21 is proportional to the instantaneous rotation rate and is passed as the rotation rate measurement to a rotation rate output 24 and to the second modulator 18, which resets the corresponding rotation rate components of the read oscillation.

A Coriolis gyro 1 as described above can be operated in either a double-resonant form or in a form in which it is not double-resonant. When the Coriolis gyro 1 is operated in a double-resonant form, the frequency of $\omega 2$ of the read oscillation is approximately equal to the frequency $\omega 1$ of the stimulation oscillation. In contrast, when it is operated in a form in which it is not double-resonant, the frequency $\omega 2$ of the read oscillation differs from the frequency $\omega 1$ of the stimulation oscillation. In the case of double-resonance, the output signal from the fourth low-pass filter 20 contains information about the rotation rate, while, when it is not operated in double-resonant form, the output signal from the third low-pass filter 16 contains the rotation rate information. A doubling switch 25 which selectively connects the outputs of the third and fourth low-pass filters 16, 20 to the rotation rate regulator 21 and to the quadrature regulator 17 is provided for switching between the double-resonant and non-double resonant modes.

When the Coriolis gyro 1 is operated in a double-resonant form, the frequency of the read oscillation is tuned, as mentioned, to that of the stimulation oscillation. This may be done to the resonator 2, for example by mechanical means, in which material is removed from the mass system. As an alternative, the frequency of the read oscillation can be set by means of an electrical field in which the resonator 2 is mounted to oscillate (i.e., by changing the electrical field strength). It is thus possible to tune the frequency of the read oscillation to the frequency of the stimulated oscillation electronically during operation of the Coriolis gyro 1.

SUMMARY AND OBJECTS OF THE INVENTION

It is an object of the invention to provide a method for electronically tuning the frequency of the read oscillation in a Coriolis gyro to that of the stimulation oscillation.

The present invention addresses the preceding and other objects by providing, in a first aspect, a method for electronic tuning of the frequency of the read oscillation in a Coriolis gyro. The resonator of such gyro has a disturbance force applied to it such that the stimulation oscillation remains essentially uninfluenced and the read oscillation changes such that a read signal that represents the read oscillation contains a corresponding disturbance component.

In the method of the invention, the frequency of the read oscillation is controlled such that any phase shift between a disturbance signal that produces the disturbance force and the disturbance component that is contained in the read signal is as small as possible.

In a second aspect, the invention provides a Coriolis gyro of the type that has a rotation rate control loop and a quadrature control loop. Such gyro is characterized by a device for electronic tuning of the frequency of the read oscillation to the frequency of the stimulation oscillation.

The device includes a disturbance unit that passes a disturbance signal to the rotation rate control loop or to the quadrature control loop. A disturbance signal detection unit is provided that determines a disturbance component that is contained in a read signal (which represents the read oscillation) and has been produced by the disturbance signal. A control unit controls the frequency of the read oscillation such that any phase shift between the disturbance signal and the disturbance component that is contained in the read signal is as small as possible.

The preceding and other features of the invention will become further apparent from the detailed description that follows. Such description is accompanied by a set of drawings. Numerals of the drawings, corresponding to those of the written description, point to the features of the invention with like numerals referring to like features throughout.

DETAILED DESCRIPTION OF THE PREFERRED EMBODIMENT

Figure 1:
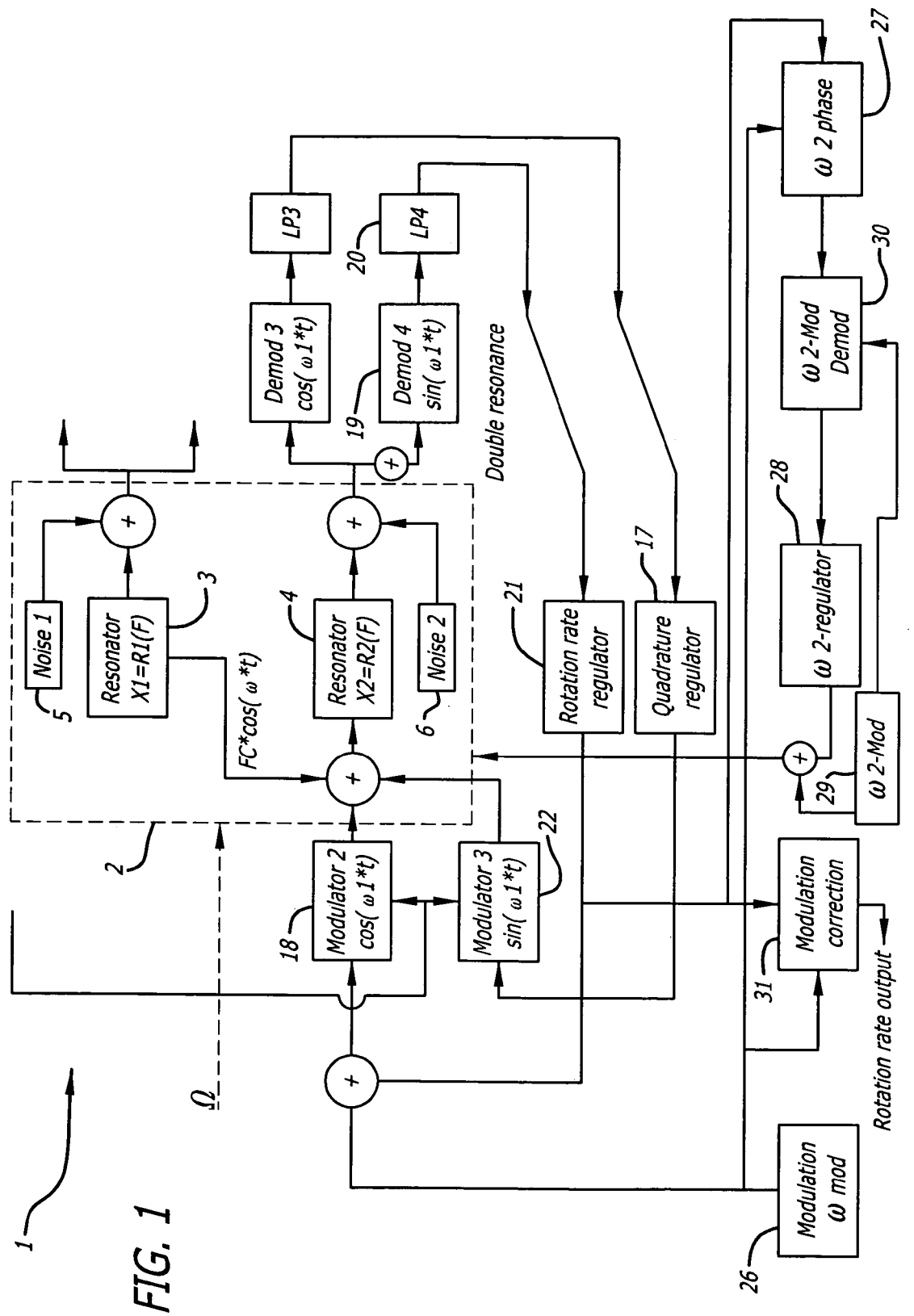
FIG. 1 is a schematic diagram of a Coriolis gyro based on the method of the invention.

FIG. 1 is a schematic diagram of a Coriolis gyro 1' based on the method of the invention. The Coriolis gyro 1' additionally includes a disturbance unit 26, a demodulation unit 27 and a read oscillation frequency regulator 28.

The disturbance unit 26 generates an alternating signal of frequency $\omega_{mod}$ that is added to the output of a quadrature regulator 21 (i.e. at the force output from the quadrature control loop). The collated signal obtained in this way is supplied to a (third) modulator 22 whose output is applied to a force transmitter (not shown), and, thus, to the resonator 2. As long as the frequency of the read oscillation does not essentially match that of the stimulation oscillation, the alternating signal produced by the disturbance modulation unit 26 is observed, after "passing through" the resonator 2, in the form of a disturbance component on the tapped-off read oscillation signal.

The tapped-off read oscillation signal is subjected to a demodulation process (carried out by means of a fourth demodulator 19) and supplied to a fourth low-pass filter 20 whose output is applied both to a rotation rate regulator 21 and to the demodulation unit 27. The signal supplied to the demodulation unit 27 is demodulated with a modulation frequency $\omega_{mod}$ that corresponds to the frequency of the alternating signal produced by the disturbance unit 26. The disturbance component (or the signal which represents the disturbance) is thus determined.

The demodulation unit 27 in this example can thus be regarded as a disturbance signal detection unit. An output signal from the demodulation unit 27 is supplied to the read oscillation frequency regulator 28 that sets the frequency of the read oscillation as a function of it so that the output signal from the demodulation unit 27 (i.e. the strength of the observed disturbance component) is a minimum. When a minimum has been reached, then the frequencies of the stimulation oscillation and the read oscillation essentially match. The signal supplied to the demodulation unit 27 may also, as an alternative to the signal supplied to the rotation rate regulator 21, be the signal that the rotation rate regulator 21 emits.

As mentioned above, and as an alternative, the alternating signal produced by the disturbance unit 26 can also be added to an output of the rotation rate regulator 21. In such case, the signal supplied to the demodulation unit 27 would be tapped off at the input or output of the quadrature regulator 17.

In principle, it is also possible to feed the disturbance signal (in this case the alternating signal, although other disturbance signals such as band-limited noise are also possible) into the quadrature control loop at any desired point (not only directly upstream of the third modulator 22, i.e., at any desired point between the point at which the read oscillation is tapped off and the third modulator 22). Analogous considerations apply to feeding the disturbance signal into the rotation rate control loop.

Once the Coriolis gyro 1' has been switched on, it is advantageous to set the modulation frequency $\omega_{mod}$ of the alternating signal to a high value to quickly achieve coarse control of the read oscillation frequency. It is then possible to switch to a relatively low modulation frequency $\omega_{mod}$ to set resonance of the read oscillation precisely. Further, the amplitude of the modulation frequency $\omega_{mod}$ can be greatly reduced a certain amount of time after stabilization of the rotation rate regulator 21 and/or of the quadrature regulator 17. Since the alternating signal at the output of the rotation rate control loop, (i.e. the third control loop) is compensated, there is generally no need for any blocking filter for the modulation frequency ωmod in the rotation rate control loop.

In principle, all the modulation processes may also be based on band-limited noise. This means that all of the alternating signals described above (the first disturbance signal, ωmod, and the second disturbance signal, ω2-mod) can be replaced by corresponding noise signal. In such case, the corresponding demodulation processes are based on cross-correlation (i.e. correlation between the noise signals and the read signal which contains noise (disturbance) components produced by the noise signals.)

In a second, alternative method for electronic tuning the frequency of the read oscillation to that of the stimulation oscillation in a Coriolis gyro, a disturbance force is applied to the resonator of the Coriolis gyro so that (a) the stimulation oscillation remains essentially uninfluenced, and (b) the read oscillation is changed such that a read signal which represents the read oscillation contains a corresponding disturbance component. In this way, the frequency of the read oscillation is controlled so that any phase shift between a disturbance signal that produces the disturbance force and the disturbance component contained in the read signal is as small as possible.

Figure 2:
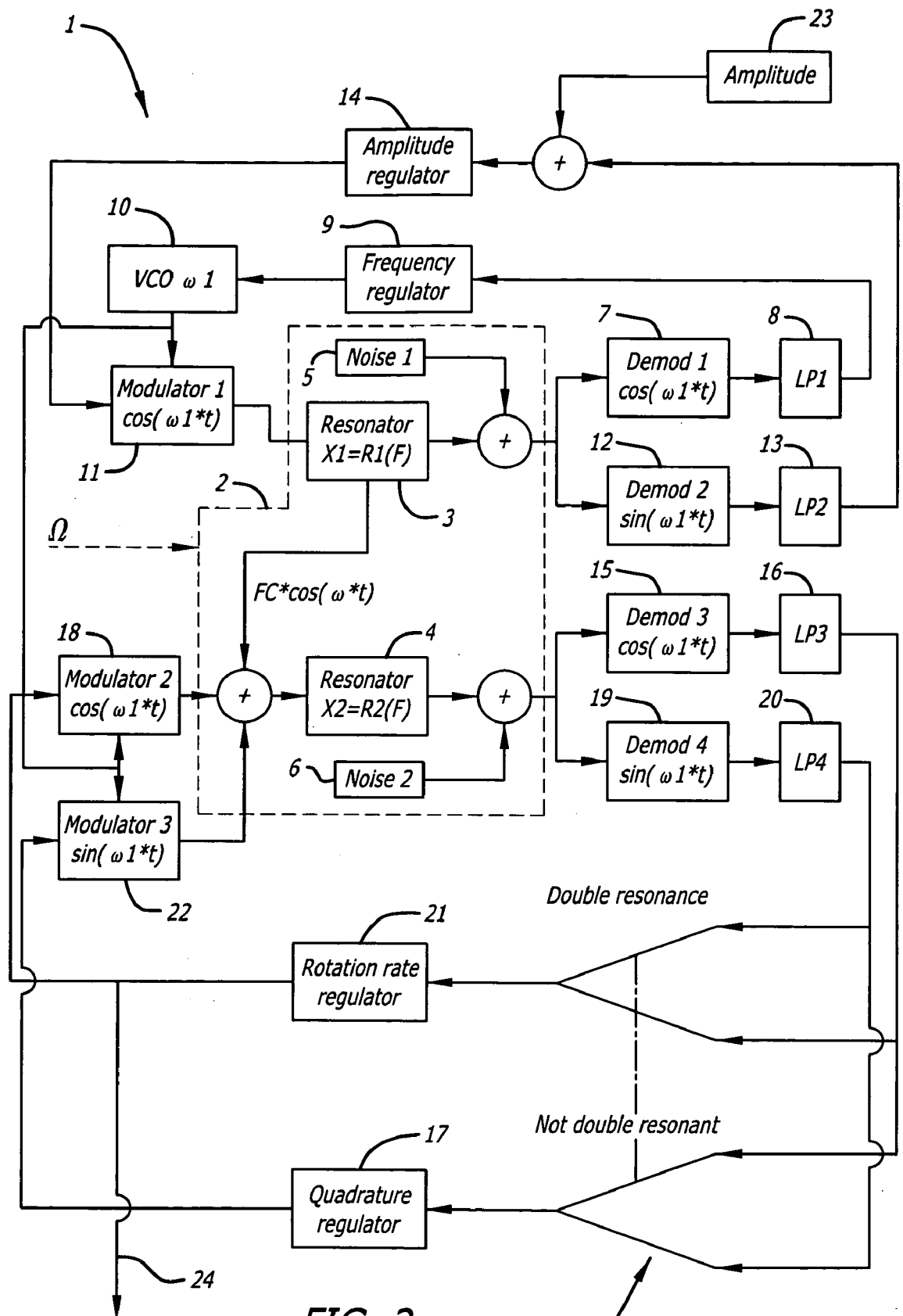
FIG. 2 is a schematic diagram of a Coriolis gyro in accordance with the prior art.

A major discovery on which the invention is based is that an artificial change to the read oscillation in the rotation rate channel or quadrature channel is visible to a greater extent, in particular in the respective channel which is orthogonal to it, the less the frequency of the read oscillation matches the frequency of the stimulation oscillation. The "penetration strength" of a disturbance such as this to the tapped-off read oscillation signal (in particular to the orthogonal channel) is thus a measure of how accurately the frequency of the read oscillation is matched to the frequency of the stimulation oscillation. Thus, if the frequency of the read oscillation is controlled so that the penetration strength assumes a minimum (i.e., such that the magnitude of the disturbance component which is contained in the tapped-off read oscillation signal is a minimum) then the frequency of the read oscillation is at the same time essentially matched to the frequency of the stimulation oscillation. The significant factor in this case is that the disturbance forces on the resonator change only the read oscillation, but not the stimulation oscillation. With reference to FIG. 2, this means that the disturbance forces act only on the second resonator 4, but not on the first resonator 3.

In a third alternative embodiment of the method for electronic tuning of the frequency of the read oscillation to that of the stimulation oscillation in a Coriolis gyro, a disturbance force is applied to the resonator of the Coriolis gyro such that (a) the stimulation oscillation remains essentially uninfluenced and (b) the read oscillation is changed so that a read signal representing the read oscillation contains a corresponding disturbance component. The disturbance force is defined as the force caused by the signal noise in the read signal. The frequency of the read oscillation, in such case, is controlled so that the magnitude of the disturbance component contained in the read signal (i.e., the noise component) is a small as possible.

"Resonator" in this case refers to the entire mass system that can be caused to oscillate in the Coriolis gyro (i.e., that part of the Coriolis gyro which is identified by the reference number 2). The essential feature in this case is that the disturbance forces on the resonator change only the read oscillation, but not the stimulation oscillation. With reference to FIG. 2, this would mean that the disturbance forces act only on the second resonator 4, but not the first resonator 3.

A significant discovery on which the third method is based is that a disturbance signal, in the form of signal noise, which occurs directly in the tapped-off read oscillation signal or at the input of the control loops (rotation rate control loop/quadrature control loop), can be observed to a greater extent in the tapped-off read oscillation signal after "passing through" the control loops and the resonator, the less the frequency of the read oscillation matches the frequency of the stimulation oscillation. The signal noise (the signal noise of the read oscillation tapping-off electronics or the random walk of the Coriolis gyro) is applied, after "passing through" the control loops, to the force transmitters and thus produces corresponding disturbance forces that are applied to the resonator and, thus, cause an artificial change in the read oscillation. The "penetration strength" of a disturbance such as this to the tapped-off read oscillation signal is thus a measure of how accurately the frequency of the read oscillation is matched to that of the stimulation oscillation. Thus, if the frequency of the read oscillation is controlled so that the penetration strength assumes a minimum, (i.e., the magnitude of the disturbance component which is contained in the tapped-off read oscillation signal, that is the noise component) then the frequency of the read oscillation is at the same time matched to the frequency of the stimulation oscillation.

The first method described for electronic tuning of the read oscillation frequency can be combined as required with the second method and/or with the third method. For example, it is possible to use the method described first while the Coriolis gyro is being started up (rapid transient response), and then to use the third method (slow control process) in steady-state operation.

In this case, "resonator" refers to the entire mass system (or part of it) that can be caused to oscillate in the Coriolis gyro (i.e., that part of the Coriolis gyro that is annotated with reference numeral 2).

A significant discovery on which the second alternative method is based is that the "time for disturbance to pass through" the resonator (i.e., an artificial change to the read oscillation resulting from the application of appropriate disturbance forces to the resonator), the time that passes from the effect of the disturbance on the resonator until the disturbance is tapped off as part of the read signal, is dependent on the frequency of read oscillation. The shift between the phase of the disturbance signal and the phase of the disturbance component signal contained in the read signal is thus a measure of the frequency of the read oscillation. It can be shown that the phase shift assumes a minimum when the frequency of the read oscillation essentially matches that of the stimulation oscillation. If the frequency of the read oscillation is controlled such that the phase shift assumes a minimum, then the frequency of the read oscillation is at the same time essentially matched to the frequency of the stimulation oscillation.

The significant factor in this case is that the disturbance forces on the resonator change only the read oscillation, but not the stimulation oscillation. With reference to FIG. 2, this means that the disturbance forces act only on the second resonator 4, but not on the first resonator 3.

The disturbance force is preferably produced by a disturbance signal that is supplied to appropriate force transmitters, or is added to signals which are supplied to the force transmitters. For example, a disturbance signal can be added to the respective control/reset signals for control/compensation of the read oscillation, to produce the disturbance force.

The disturbance signal is preferably an alternating signal (e.g. a superposition of sine-wave signals and cosine-wave signals). This disturbance signal is generally at a fixed disturbance frequency so that the disturbance component of the tapped-off read oscillation signal can be determined by means of an appropriate demodulation process carried out at the disturbance frequency. One alternative is to use band-limited noise instead of an alternating signal. In this case, the disturbance component is demodulated from the read signal by correlation of the disturbance signal (noise signal) with the read signal (the signal which contains the disturbance component). The bandwidth of the noise in this case is dependent on the characteristics of the resonator 2 and of the control loops.

The method described above can be used for both an open loop and a closed loop Coriolis gyro. In the latter case, the disturbance signal is preferably added to the respective control/reset signals for control/compensation of the read oscillation. For example, the disturbance signal can be added to the output signal from a rotation rate control loop, and the disturbance component can be determined from a signal that is applied to or emitted from a quadrature regulator in a quadrature control loop. Conversely, the disturbance signal can be added to the output signal from the quadrature control loop, and the disturbance component can be determined from a signal that is applied to or is emitted from a rotation rate regulator in the rotation rate control loop. As an alternative, the disturbance signal can be added to the output signal from the quadrature control loop and the disturbance component determined from a signal which is applied to, or emitted from, a quadrature regulator in the quadrature control loop. It is also possible to add the disturbance signal to the output signal from the rotation rate control loop, and to determine the disturbance component from a signal which is applied to, or emitted from, a rotation rate regulator in the rotation rate control loop. The expression "read signal" covers all signals that are referred to in this paragraph and from which the disturbance component can be determined. In addition, the expression "read signal" covers the tapped-off read oscillation signal.

The frequency of the read oscillation (i.e. the force transmission of the control forces which are required for frequency control) is in this case controlled by controlling the intensity of an electrical field in which at least a part of the resonator oscillates, with an electrical attraction force. Such force, preferably non-linear, is established between the resonator and an opposing piece, fixed to the frame and surrounding.

While the invention has been described with reference to its presently-preferred embodiment, it is not limited thereto. Rather, the invention is limited only insofar as it is defined by the following set of patent claims and includes within its scope all equivalents thereof.

The invention claimed is:

1. A method for electronic tuning of the frequency of a read oscillation to the frequency of a stimulation oscillation in a Coriolis gyro wherein
  a resonator of the Coriolis gyro has a disturbance force applied to the resonator such that
  a) the stimulation oscillation remains essentially uninfluenced, and
  b) the read oscillation is changed such that a signal which represents the read oscillation contains a corresponding disturbance component, wherein
    the frequency of the read oscillation is controlled such that any phase shift between a disturbance signal which produces the disturbance force and the disturbance component which is contained in the read signal is as small as possible.

2. The method as claimed in claim 1, characterized in that a disturbance force is produced by a disturbance signal which is added to the respective control/reset signals for control/compensation of the read oscillation.

3. The method as claimed in claim 1, characterized in that the disturbance signal is an alternating signal.

4. The method as claimed in claim 3, characterized in that the disturbance signal is at a fixed disturbance frequency, and the disturbance component is determined from the read signal by demodulation of the read signal at the fixed disturbance frequency.

5. The method as claimed in claim 1, characterized in that the disturbance signal is a band-limited noise signal.

6. The method as claimed in claim 5, characterized in that the disturbance component is demodulated from the read signal by correlation of the disturbance signal with the read signal.

7. The method as claimed in claim 2, characterized in that the disturbance signal is added to an output signal from a quadrature control loop, and the disturbance component is determined from a signal which is applied to a quadrature regulator in the quadrature control loop, or is emitted from the quadrature regulator.

8. The method as claimed in claim 2, characterized in that the disturbance signal is added to an output signal from a rotation rate control loop, and the disturbance component is determined from a signal which is applied to a rotation rate regulator in the rotation rate control loop, or is emitted from the rotation rate regulator.

9. The method as claimed in claim 2, characterized in that the frequency of the read oscillation is controlled by controlling the intensity of an electrical field in which a part of the resonator of the Coriolis gyro oscillates.

10. A Coriolis gyro which has a rotation rate control loop and a quadrature control loop, characterized by a device for electronic tuning of the frequency of a read oscillation to the frequency of a stimulation oscillation, having:
  a disturbance unit which passes a disturbance signal to the rotation rate control loop or to the quadrature control loop,
  a disturbance signal detection unit, which determines a disturbance component which is contained in a read signal, which represents the read oscillation, and has been produced by the disturbance signal, and
  a control unit, which controls the frequency of the read oscillation such that any phase shift between the disturbance signal and the disturbance component which is contained in the read signal is as small as possible.

11. The Coriolis gyro as claimed in claim 10, characterized in that the disturbance unit passes the disturbance signal to the rotation rate control loop, and the disturbance signal detection unit determines the disturbance component from a signal which is applied to a rotation rate regulator in the rotation rate control loop, or is emitted from the rotation rate regulator.

12. The Coriolis gyro as claimed in claim 10, characterized in that the disturbance unit passes the disturbance signal to the quadrature control loop, and the disturbance signal detection unit determines the disturbance component from a signal which is applied to a quadrature regulator in the quadrature control loop, or is emitted from it.

* * * * *